(12) United States Patent
Ehrmantraut

(10) Patent No.: US 10,148,121 B2
(45) Date of Patent: Dec. 4, 2018

(54) SOLAR POWER SYSTEM AND METHOD THEREOF

(71) Applicant: Aurora Flight Sciences Corporation, Manassas, VA (US)

(72) Inventor: Adam Scott Ehrmantraut, Dumfries, VA (US)

(73) Assignee: Aurora Flight Sciences Corporation, Manassas, VA (US)

(*) Notice: Subject to any disclaimer, the term of this patent is extended or adjusted under 35 U.S.C. 154(b) by 0 days.

(21) Appl. No.: 15/593,617

(22) Filed: May 12, 2017

(65) Prior Publication Data

US 2017/0331323 A1 Nov. 16, 2017

Related U.S. Application Data

(60) Provisional application No. 62/335,818, filed on May 13, 2016.

(51) Int. Cl.
*B64C 39/02* (2006.01)
*H02J 7/35* (2006.01)
*H02S 20/30* (2014.01)
*H02S 40/38* (2014.01)
*H02K 11/30* (2016.01)
(Continued)

(52) U.S. Cl.
CPC ............... *H02J 7/35* (2013.01); *B64D 27/24* (2013.01); *G05F 5/00* (2013.01); *H02K 7/116* (2013.01); *H02K 7/14* (2013.01); *H02K 11/30* (2016.01); *H02P 6/14* (2013.01); *H02S 20/30* (2014.12); *H02S 40/38* (2014.12); *H02S 50/00* (2013.01);
(Continued)

(58) Field of Classification Search
CPC ........ B64C 39/02; H05B 37/02; B60Q 9/008; B64B 1/06; B64B 1/24
USPC ........................................................ 318/139
See application file for complete search history.

(56) References Cited

U.S. PATENT DOCUMENTS 4,415,133 A * 11/1983 Phillips ................... B64C 31/00
244/13
4,661,758 A 4/1987 Whittaker
(Continued)

FOREIGN PATENT DOCUMENTS

WO WO2011/149544 12/2011
WO WO 2015-012769 1/2015

OTHER PUBLICATIONS

International Search Report and Written Opinion, dated Aug. 16, 2017, in International application No. PCT/US2017/032373, filed May 12, 2017.
(Continued)

*Primary Examiner* — Rina Duda
(74) *Attorney, Agent, or Firm* — Michael Stanley Tomsa; McAndrews, Held & Malloy, Ltd.; Eugene H. Nahm

(57) ABSTRACT

A solar power system comprising a solar panel, a load, and a battery pack group. The load comprising an electric motor operatively coupled with a propeller. The battery pack group comprises one or more voltage controllable battery packs, each of said one or more voltage controllable battery packs comprising a plurality of battery cells. The voltage controllable battery packs having a rigid printed circuit board electrically coupled with the plurality of battery cells, the rigid printed circuit board including an interconnect connector to electrically couple with a corresponding interconnect connector of a second voltage controllable battery pack.

21 Claims, 10 Drawing Sheets

(51) Int. Cl.
*B64D 27/24* (2006.01)
*G05F 5/00* (2006.01)
*H02K 7/116* (2006.01)
*H02K 7/14* (2006.01)
*H02P 6/14* (2016.01)
*H02S 50/00* (2014.01)
*H02J 7/00* (2006.01)

(52) U.S. Cl.
CPC ......... *B64D 2211/00* (2013.01); *H02J 7/0024* (2013.01)

(56) References Cited

U.S. PATENT DOCUMENTS

| | | | |
|---|---|---|---|
| 5,810,284 A * | 9/1998 | Hibbs | B64C 39/10 244/13 |
| 6,045,089 A * | 4/2000 | Chen | A01G 15/00 244/1 R |
| 6,368,743 B1 | 4/2002 | Guerin et al. | |
| 7,075,194 B2 | 7/2006 | Weidenheimer et al. | |
| 7,270,295 B2 * | 9/2007 | Bennett | B64D 27/24 244/59 |
| 7,278,607 B2 * | 10/2007 | Fuller | B64B 1/14 244/30 |
| 8,356,770 B2 | 1/2013 | Parks | |
| 8,717,187 B2 * | 5/2014 | Lockwood | H05B 37/0227 340/636.12 |
| 8,937,254 B2 | 1/2015 | Wen et al. | |
| 2007/0062744 A1 | 3/2007 | Weidenheimer et al. | |
| 2008/0143292 A1 | 6/2008 | Ward | |
| 2008/0215200 A1 | 9/2008 | Toth | |
| 2009/0085553 A1 | 4/2009 | Kumar et al. | |
| 2010/0213887 A1 | 8/2010 | Louch | |
| 2010/0261043 A1 | 10/2010 | Kim et al. | |
| 2010/0261048 A1 | 10/2010 | Kim et al. | |
| 2010/0305792 A1 | 12/2010 | Wilk et al. | |
| 2011/0025258 A1 | 2/2011 | Kim et al. | |
| 2011/0057617 A1 | 3/2011 | Finberg et al. | |
| 2011/0073717 A1 * | 3/2011 | Foucault | B64D 27/24 244/53 R |
| 2012/0133310 A1 | 5/2012 | Lee | |
| 2013/0181661 A1 | 7/2013 | Workman et al. | |
| 2014/0061376 A1 | 3/2014 | Fisher et al. | |
| 2014/0248520 A1 | 9/2014 | Ward et al. | |
| 2014/0312828 A1 | 10/2014 | Vo et al. | |
| 2016/0311545 A1 | 10/2016 | Parks et al. | |

OTHER PUBLICATIONS

Murnane, Martin, et al., A Closer Look at State of Charge (SOC) and State of Health (SOH) Estimation Techniques for Batteries, ©2017 Analog Devices, Inc.

* cited by examiner

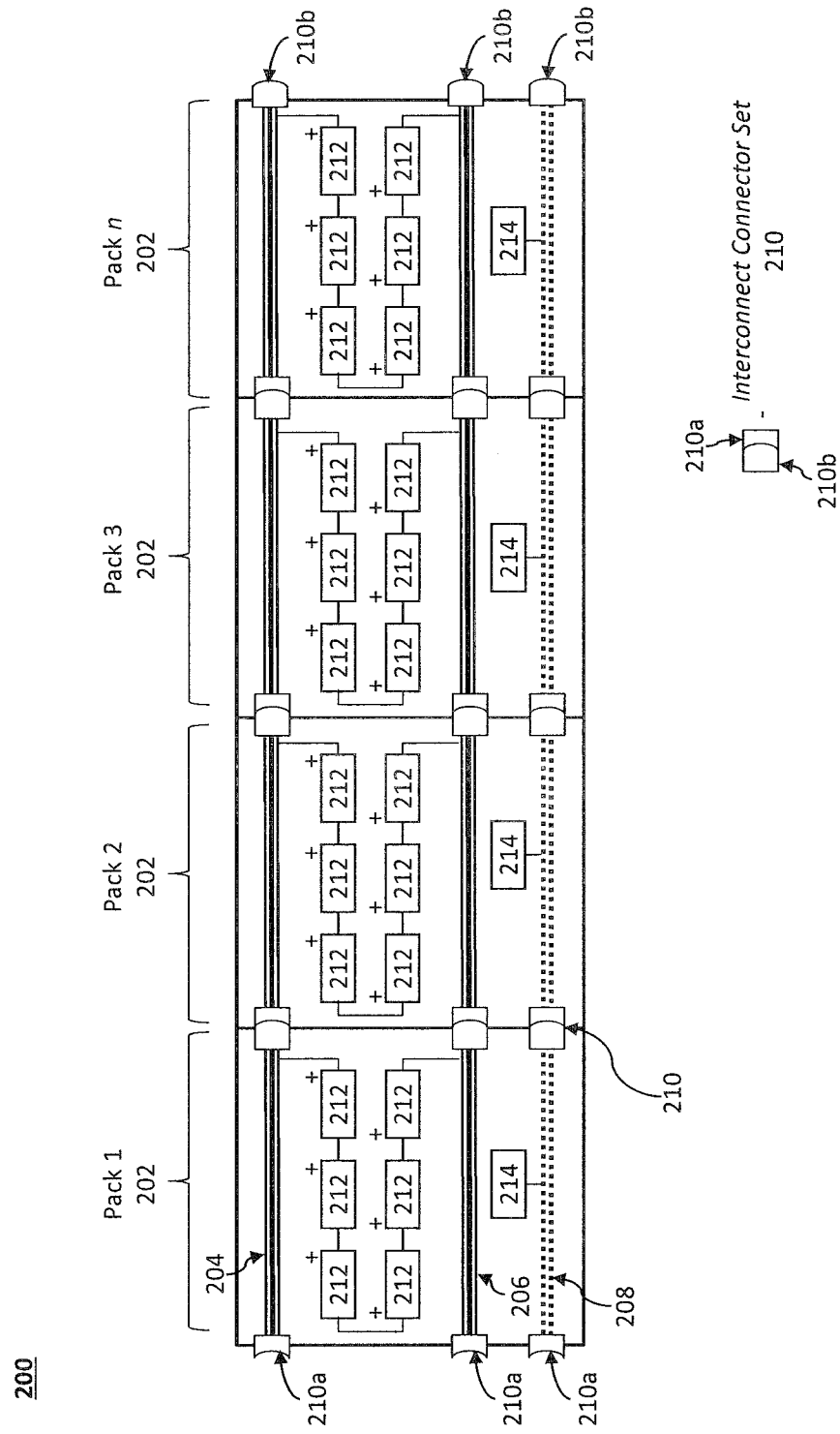

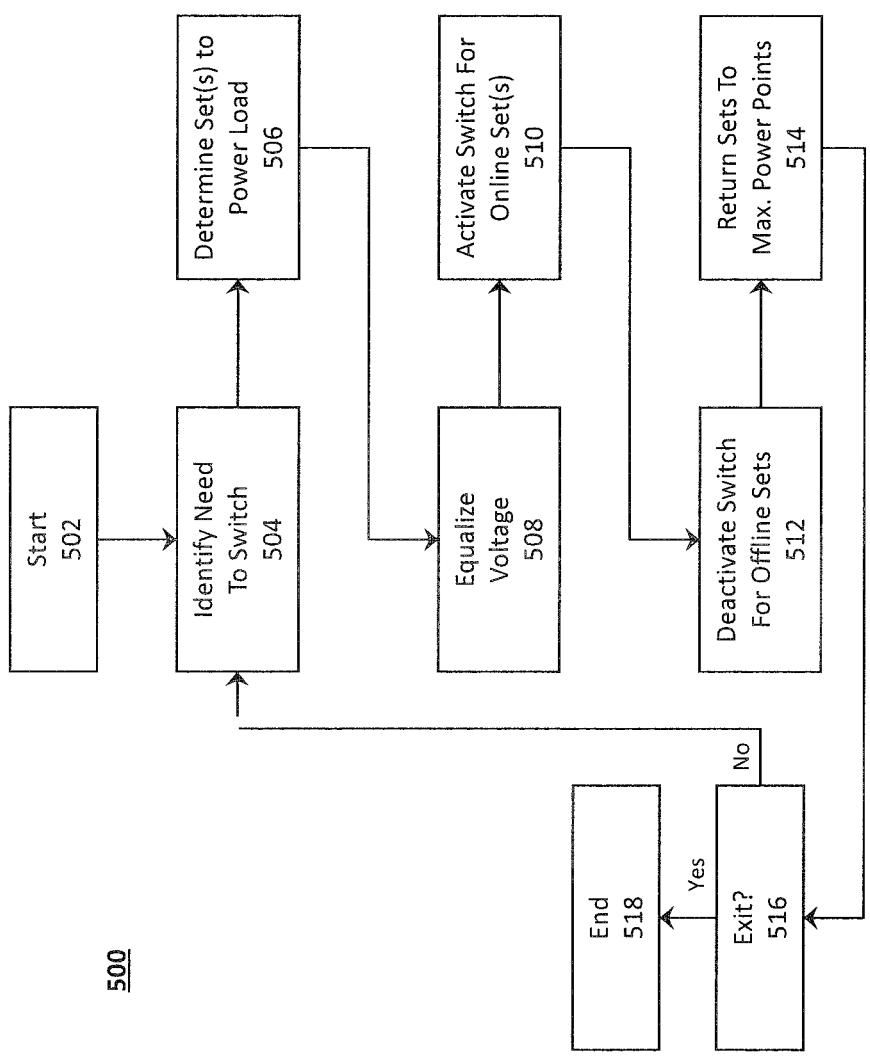

SOLAR POWER SYSTEM AND METHOD THEREOF

CROSS REFERENCE TO RELATED APPLICATIONS

This application claims priority to U.S. Provisional Patent Application No. 62/335,818 filed on May 13, 2016, entitled "Solar Power System and Method Thereof," which is hereby incorporated by reference in its entirety.

FIELD OF THE INVENTION

The present invention generally relates to a solar-powered aircraft comprising and a battery/solar controller and an array of intelligent controllable battery packs for use with, inter alia, the solar-powered aircraft, more particularly to the power system for a solar powered aircraft that includes one or more battery/solar controller and an array of intelligent controllable battery packs for use with, inter alia, the solar-powered aircraft. The present invention is not limited to the above aircraft application, but exhibits properties particularly useful for said application.

BACKGROUND

The concept of high-altitude, long-endurance solar-powered aircraft has been demonstrated by a number of air vehicle research projects in the past.

An example of previously built and flown state of the art is the AeroVironment aircraft, culminating in the Helios. Much of this is described in U.S. Pat. No. 5,804,284, to Hibbs, et al. (hereinafter, the Hibbs patent). The Hibbs patent shows a very large wingspan aircraft, with the solar collection and other mass distributed along a very high aspect ratio wing. This allowed the use of a very light wing spar, and the simple, clean design consumed very low power during the night. As can be appreciated, night time power usage is especially critical because the storage system is quite heavy. This means a large amount of solar energy must be collected to provide even a small amount of power at night. In the example given in the Hibbs patent, 2.5 Watt hours of electrical power had to be collected during the day to provide 1 Watt hour at night. More recently, the Solar Impulse II, a Swiss long-range experimental solar-powered fixed-wing aircraft, endeavored to achieve the first circumnavigation of the Earth. The Solar Impulse II provided 17,248 photovoltaic cells cover the top of the wings, fuselage, and empennage for a total area of 269.5 square meters (rated at 66 kW peak). The Solar Impulse employed four electric motors powered from the solar panels and four 41 kWh lithium-ion batteries, providing 13 kW, electric motors (17.4 HP) each.

Existing solar power systems typically rely on a solar array interfacing to a grid or battery system through a maximum power point tracker having a circuit assembly that adjusts the load impedance presented to the solar array in or to get the maximum power out of the array. These trackers, however, are heavy, costly, and detract from the total output power of the solar array. Moreover, typical large scale battery systems consist of a parallel strings of series connected battery cells that operate at the same voltage. Existing systems do not offer pack level monitoring and scale control sufficient for control of voltage controllable packs. In addition, the packs are typically connected in parallel through a busbar and/or wire harness, which results in increased weight and complexity. Also, typical systems cannot control the various parallel strings output voltage and are unable to balance the source current with secondary elements. Finally, existing packaging battery cell groups detract from the overall pack specific energy density and are therefore not designed to support long endurance aircraft while keeping rate production in mind. Thus, a need exists for a solar power systems that can overcome the deficiencies of the prior art, by providing improved control of the battery packs and solar panels. Such solar power systems may be employed with solar-powered aircraft, such as long endurance solar-powered aircraft.

SUMMARY

According to a first aspect of the present invention, a solar power system comprises: a first solar panel and a second solar panel; a load, the load comprising an electric motor operatively coupled with a propeller; a first battery pack group and a second battery pack group, each of said first and second battery pack groups comprising one or more voltage controllable battery packs, each of said one or more voltage controllable battery packs comprising a plurality of battery cells; a first source switch and a second source switch, wherein the first source switch is electrically coupled in-line between the first battery pack group and the load, and wherein the second source switch is electrically coupled in-line between the second battery pack group and the load; and a controller operatively coupled to each of said first source switch and said second source switch, the controller being configured to selectively activate or deactivate each of said first source switch and said second source switch.

In certain aspects, said first battery pack group is electrically coupled to said first solar panel in parallel.

In certain aspects, said second battery pack group is electrically coupled to said second solar panel in parallel.

In certain aspects, the controller selectively activates or deactivates said first source switch and said second source switch based upon a state of charge of the first battery pack group or the second battery pack group.

In certain aspects, the controller selectively activates or deactivates said first source switch and said second source switch based upon a maximum power point of the first solar panel or the second solar panel.

In certain aspects, the controller selectively activates both of said first source switch and said second source switch to set the first battery pack group and the second battery pack group to the same voltage.

In certain aspects, the controller sets the first battery pack group and the second battery pack group to the same voltage during a nighttime operation.

In certain aspects, the one or more voltage controllable battery packs of the first or second battery pack groups are electrically coupled to one another in parallel.

In certain aspects, a first voltage controllable battery pack of said one or more voltage controllable battery packs comprises a rigid printed circuit board electrically coupled with the plurality of battery cells.

In certain aspects, the rigid printed circuit board includes an interconnect connector to electrically couple with a corresponding interconnect connector of a second voltage controllable battery pack.

In certain aspects, a first voltage controllable battery pack of said one or more voltage controllable battery packs comprises a first rigid printed circuit board and a second rigid printed circuit board electrically coupled with the plurality of battery cells, wherein the plurality of battery cells are positioned between said first rigid printed circuit board and said second rigid printed circuit board.

In certain aspects, a first voltage controllable battery pack of said one or more voltage controllable battery packs comprises a rigid printed circuit having a set of power connectors, a set of ground connectors, and a set of data connectors.

In certain aspects, the first solar panel is positioned on a first wing panel and a second solar panel is positioned on a second wing panel.

According to a second aspect of the present invention, a solar power system comprises: a solar panel; a load, the load comprising an electric motor operatively coupled with a propeller; a battery pack group, said battery pack group comprising one or more voltage controllable battery packs, each of said one or more voltage controllable battery packs comprising a plurality of battery cells, wherein at least one of said one or more voltage controllable battery packs comprises a rigid printed circuit board electrically coupled with the plurality of battery cells, the rigid printed circuit board including an interconnect connector to electrically couple with a corresponding interconnect connector of a second voltage controllable battery pack.

In certain aspects, the solar power system further comprises a source switch and a controller operatively coupled to said source switch, wherein the source switch is electrically coupled in-line between the battery pack group and the load, and wherein the controller is configured to selectively activate or deactivate said source switch.

In certain aspects, the controller selectively activates or deactivates said source switch based at least in part upon (a) a state of charge of the battery pack group or (b) a maximum power point of the solar panel.

In certain aspects, at least one of said one or more voltage controllable battery packs is set to a target voltage to track the maximum power point of the solar panel, such as the first solar panel or the second solar panel.

In certain aspects, at least one of said one or more voltage controllable battery packs comprises a second rigid printed circuit board electrically coupled with the plurality of battery cells, wherein the plurality of battery cells are positioned between said first rigid printed circuit board and said second rigid printed circuit board.

In certain aspects, at least one of said one or more voltage controllable battery packs comprises an integrated environmental controls system.

According to a third aspect of the present invention, a voltage controllable battery pack for use in a solar power system comprises: a plurality of battery cells; a plurality of interconnect connectors to electrically couple with another voltage controllable battery pack, wherein the plurality of interconnect connectors includes a first power connector, a second power connector, a first ground connector, a second ground connector, a first data connector, and a second data connector; and a rigid printed circuit board electrically coupled with each of the plurality of battery cells and the plurality of interconnect connectors; wherein said first power connector, said first ground connector, and said first data connector are positioned on a first side of said rigid printed circuit board, and wherein said second power connector, said second ground connector, and said second data connector are positioned on a second side of said rigid printed circuit board, the second side being opposite the first side.

In certain aspects, the voltage controllable battery pack further comprises a second rigid printed circuit board electrically coupled with the plurality of battery cells, wherein the plurality of battery cells are positioned between said first rigid printed circuit board and said second rigid printed circuit board.

In certain aspects, the rigid printed circuit board electrically couples the plurality of battery cells in a series configuration.

In certain aspects, the rigid printed circuit board includes a processor and a plurality of switches, wherein the processor is configured to selectively control each of the plurality of switches to electrically couple the plurality of battery cells to achieve a targeted voltage.

In certain aspects, the rigid printed circuit board includes a processor and a plurality of switches, wherein the processor is configured to achieve a targeted voltage by selectively controlling each of the plurality of switches to electrically couple (1) a first plurality of battery cells in series configuration and (2) a second plurality of battery cells in a parallel configuration.

According to a fourth aspect of the present invention, a solar-powered aircraft comprises: a solar panel; a load bus, the load comprising an electric motor operatively coupled with a propeller; a battery pack group, said battery pack group comprising one or more voltage controllable battery packs, each of said one or more voltage controllable battery packs comprising a plurality of battery cells, wherein at least one of said one or more voltage controllable battery packs comprises a rigid printed circuit board electrically coupled with the plurality of battery cells, the rigid printed circuit board including an interconnect connector to electrically couple with a corresponding interconnect connector of a second voltage controllable battery pack.

In certain aspects, the solar-powered aircraft further comprises a source switch and a controller operatively coupled to said source switch, wherein the source switch is electrically coupled in-line between the battery pack group and the load bus, and wherein the controller is configured to selectively activate or deactivate said source switch.

In certain aspects, the battery pack group is electrically coupled to said solar panel in parallel.

In certain aspects, the controller selectively activates or deactivates said source switch based at least in part upon (a) a state of charge of the battery pack group or (b) a maximum power point of the solar panel.

In certain aspects, at least one of said one or more voltage controllable battery packs comprises a second rigid printed circuit board electrically coupled with the plurality of battery cells, wherein the plurality of battery cells are positioned between said first rigid printed circuit board and said second rigid printed circuit board.

In certain aspects, at least one of said one or more voltage controllable battery packs comprises an integrated environmental controls system.

According to a fifth aspect of the present invention, a voltage controllable battery pack for use in a solar-powered aircraft comprises: a plurality of battery cells operatively coupled with a plurality of solar panels; a plurality of interconnect connectors to electrically couple with another voltage controllable battery pack, wherein the plurality of interconnect connectors includes a first power connector, a second power connector, a first ground connector, a second ground connector, a first data connector, and a second data connector; and a rigid printed circuit board electrically coupled with each of the plurality of battery cells and the plurality of interconnect connectors; wherein said first power connector, said first ground connector, and said first data connector are positioned on a first side of said rigid printed circuit board, and wherein said second power connector, said second ground connector, and said second data connector are positioned on a second side of said rigid printed circuit board, the second side being opposite the first side.

In certain aspects, the voltage controllable battery pack further comprises a second rigid printed circuit board electrically coupled with the plurality of battery cells, wherein the plurality of battery cells are positioned between said first rigid printed circuit board and said second rigid printed circuit board.

BRIEF DESCRIPTION OF THE DRAWINGS

The foregoing and other objects, features, and advantages of the devices, systems, and methods described herein will be apparent from the following description of particular embodiments thereof, as illustrated in the accompanying Figures, where like reference numbers refer to like structures. The Figures are not necessarily to scale, emphasis instead being placed upon illustrating the principles of the devices, systems, and methods described herein.

FIG. 2 illustrates a battery pack group in accordance with an aspect of the present invention.

FIG. 5 illustrates an example algorithm for managing battery/solar cell groups using a power allocation switching unit system.

DETAILED DESCRIPTION

Figure 1A:
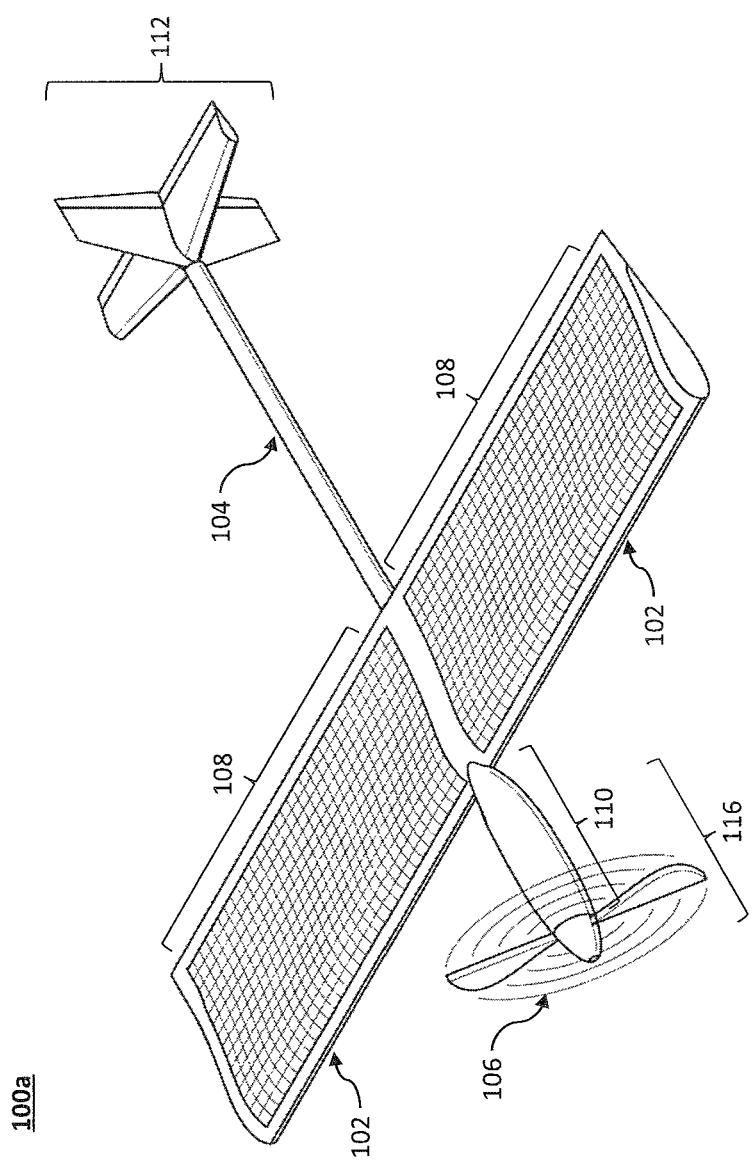
FIG. 1a illustrates an example fixed-wing solar-powered aircraft.

Described herein is a system and method for storing and managing solar energy.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like are words of convenience and are not to be construed as limiting terms. As utilized herein the terms "circuits" and "circuitry" refer to physical electronic components (i.e., hardware) and any software and/or firmware ("code"), which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As used herein, the terms "aerial vehicle" and "aircraft" refer to a machine capable of flight, including, but not limited to, fixed-wing aircraft, unmanned aerial vehicle, variable wing aircraft, and vertical take-off and landing (VTOL) aircraft. VTOL aircraft may include fixed-wing aircraft (e.g., Harrier jets), rotorcraft (e.g., helicopters), tilt-rotor/tilt-wing aircraft, multi-rotor aircraft, etc.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

FIG. 1a illustrates a perspective view of an example solar-powered aircraft 100a. The solar-powered aircraft 100a may be a fixed-wing aircraft having one or more rotor assemblies 116 (e.g., one or more propellers 106 axially driven by an electric motor 114), one or more wing panels 102 (or other flight surface), an empennage 112, a fuselage 110, and/or longitudinal boom portion 104 connecting the empennage 112 to the wing panel 102. The fuselage 110 and/or longitudinal boom portion 104 may be provided as a single structure, or as separate structures. The one or more electric motors 114 may be positioned, for example, within the fuselage 110, on the wing panels 102, or elsewhere on the solar-powered aircraft 100a.

While the solar-powered aircraft 100a is illustrated as having a single propeller 106, it should be appreciated that additional propellers 106 may be provided. For example, one or more propellers 106 may be provided on each side of the wing panel 102. The propeller 106 may be driven by the electric motor either directly or indirectly through a transmission and associated gearing. In certain aspects, a single electric motor may be configured to drive plural propellers 106 through a transmission or other gearing configuration; however a dedicated electric motor may be provided for each propeller 106 if desired. The propeller 106 and motor may be attached to the wing panel 102 (e.g., at a rib), a fuselage 110, a longitudinal boom portion 104, etc. Thus, the one or more electric motors may be positioned in, for example, the fuselage 110 or, where applicable, along the span of the wing panel 102, or a combination thereof. The electric motors are preferably direct current ("DC") brushless motors, but other motor types may be used to meet a particular need.

The empennage 112 may include a first tail panel and a second tail panel, which may be arranged perpendicularly to one another. The angle between the first tail panel and the second tail panel, however, may be adjusted. In some embodiments, the empennage 112 and the wing panel 102 may be fitted with traditional aerodynamic trailing edge control surfaces, such as ailerons, camber changing flaps, etc.

The solar-powered aircraft 100a receives power through its one or more solar panels 108 and/or one or more battery pack groups 200. As illustrated, one or more solar panels 108 may be position on, inter alia, the wing panel 102. Additional solar panels 108 may be provided on one or more of the empennage 112, fuselage 110, and/or longitudinal boom portion 104. For instance, a solar panel 108 may be positioned on a top surface or at the leading edge of a wing or wing surface. The one or more battery pack groups 200 may be distributed throughout the interior of the solar-powered aircraft 100a so as to maintain weight distribution.

As used herein, "solar panels" refer to an array of one or more photovoltaic cells configured to collect solar energy. The solar panels 108 may employ one or more of the following solar cell types: monocrystalline silicon solar cells, polycrystalline silicon solar cells, string ribbon solar cells, thin-film solar cells (TFSC), cadmium telluride (CdTe) solar cells, copper indium gallium selenide (CIS/CIGS) solar cells, and the like. To reduce overall weight and to improve reliability and durability, it is advantageous to employ light weight and/or flexible solar panels (e.g., thin-film solar panels).

The solar-powered aircraft 100a may further comprise embedded conductors, which may convey power and/or data signals throughout the solar-powered aircraft 100a. For example, the embedded conductors may be formed as a conductor sandwich assembly, such as is described in greater detail by commonly owned U.S. Pat. No. 8,937,254, titled "Apparatus and Method for an Aircraft Conductor Sandwich Assembly Embedded to an Aircraft Structure." In some embodiments, the solar-powered aircraft 100a may comprise one or more pivoting wings configuration as described in U.S. Patent Pub. No. U.S.20160311545A1 to Parks et al., filed Apr. 21, 2016, and/or one or more pivoting tail sections as described in U.S. Pat. No. 8,356,770 B2 to Parks, each of which is incorporated by reference in its entirety herein.

As will be discussed, the solar-powered aircraft 100a may further comprise a vehicle management system operable to control the various functions of the solar-powered aircraft 100a and/or one or more payloads. As used herein, "payload" refers to one or more sensors, communications packages, weapons systems, instruments, antennas, cameras, radars, navigation systems, flight control systems, or other cargo. For example, navigation and flight control systems may be communicatively coupled with an inertial navigation system ("INS") that is communicatively coupled with an inertial measurement unit and global positioning system ("GPS") receiver, an onboard data storage device (e.g., hard drive, flash memory, or the like), a wireless communication device, or virtually any other desired services. The GPS gives an absolute drift-free position value that can be used to reset the INS solution or can be blended with it by use of a mathematical algorithm, such as a Kalman Filter. The one or more payloads may be configured as a payload pod that is rotatably and pivotally coupled to the fuselage 110 (or another structural components, such as the wing panel 102 or the longitudinal boom portion 104) via a gimbal system and configured on the underside of the solar-powered aircraft 100a to enable the payload pod to be oriented downward to monitor objects on the ground.

The one or more payloads may also house an intelligence, surveillance, and reconnaissance ("ISR") payload, which may be used to collect data and/or monitor an area. For example, the solar-powered aircraft 100a may be equipped with one or more cameras, audio devices, and other sensors. Any video, or other data, collected by the solar-powered aircraft 100a may be dynamically (e.g., continuously in real-time or near real-time) communicated to a ground control station wirelessly. The solar-powered aircraft 100a may be further equipped to store said video and data to the onboard data storage device. In other aspects, the one or more payloads may include hardware that operates as a communication relay or router. For example, the solar-powered aircraft 100a may receive signals from a remotely situated device (e.g., a satellite, communication tower, or even another solar-powered aircraft) via an on board antenna. The solar-powered aircraft 100a may then relay the information from the remotely situated device to an end user on the ground proximate to the solar-powered aircraft 100a. Likewise, to facilitate two-way communication, the solar-powered aircraft 100a may receive information from the end user on the ground and relay it to the remotely situated device. Each of the motors, payloads, and control systems is an electric load because it requires electric power to operate.

Figure 1B:
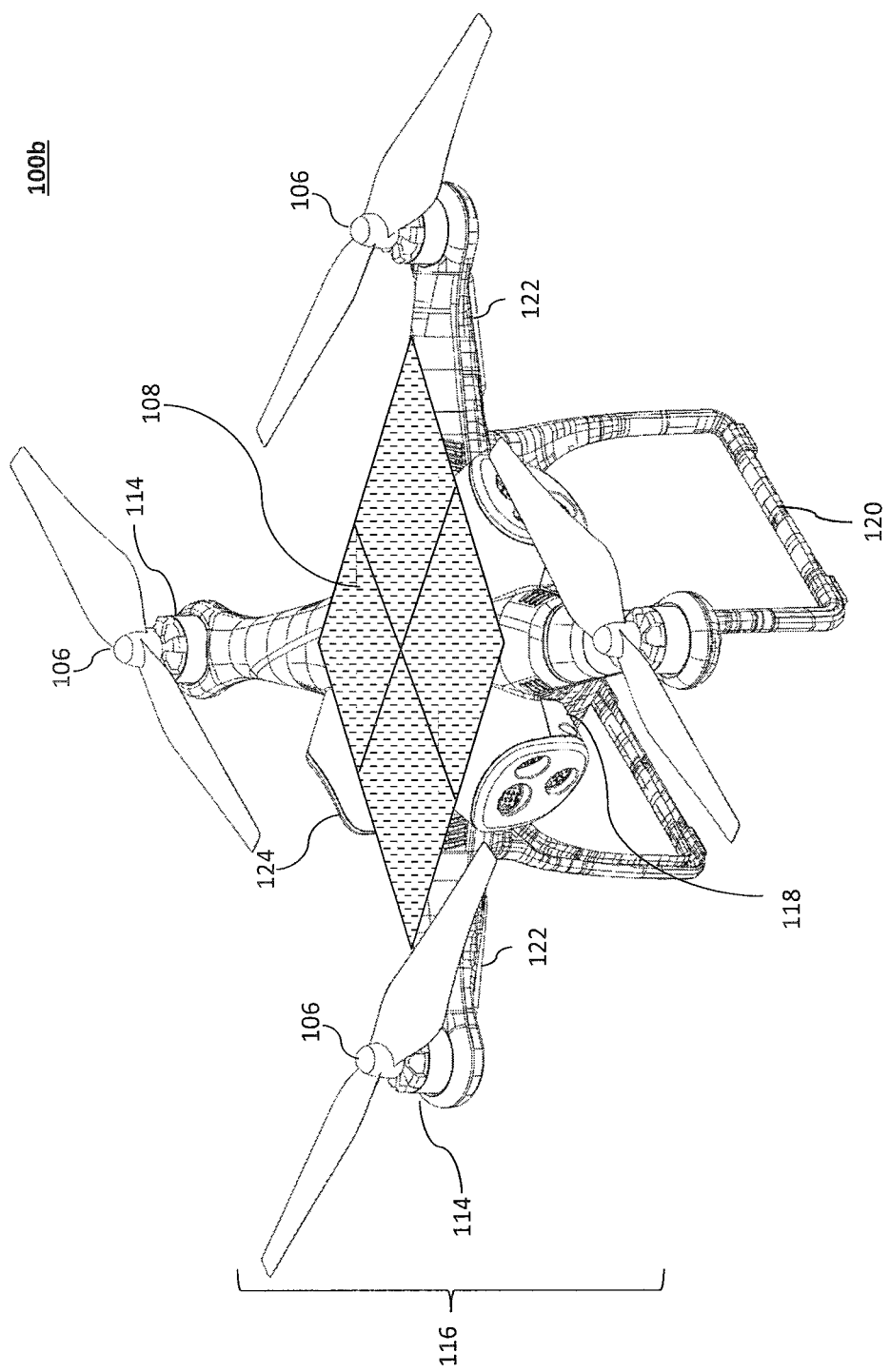
FIG. 1b illustrates an example multi-rotor solar-powered aircraft.

While FIG. 1a illustrates fixed-wing solar-powered aircraft 100a, the subject disclose is not limited to a particular aircraft configuration. FIG. 1b illustrates an example multi-rotor solar-powered aircraft 100b that may be configured with one or more solar panels 108 and a power distribution system 300a, 300b. As illustrated, the multi-rotor solar-powered aircraft 100b may include an airframe 118, landing gear 120 (e.g., skids or wheeled landing gear), a plurality of booms 122, and a plurality of rotor assemblies 116. The one or more solar panels 108 may be positioned on the airframe 118 to form a single planar panel (e.g., four panels arranged in a single plane as illustrated in FIG. 1b). In other embodiments, however, multiple planar panels (e.g., multiple non-parallel planar panels) or a flexible solar panel (or flexible solar panel array) may be positioned on the airframe and configured to conform to the shape/profile of the airframe 118. The airframe 118 may be coupled with a proximal end of each of the plurality of booms 122 such that the distal ends of the plurality of booms 122 extend radially from the airframe 118 (e.g., when viewed form the top, in an "X" arrangement, as illustrated). The airframe 118 and the plurality of booms 122 may be fabricated as a singular unit, or as separate components to be coupled to one another. The distal end of each of the plurality of booms 122 may be coupled with a rotor assembly 116, each of which is illustrated as a propeller 106 coupled with an electric motor 114 to drive/rotate the propeller 106. The electric motor 114 may be an electric motor controlled via an electronic speed controller (ESC). While the electric motors 114 are illustrated as positioned at the distal end of the boom 122, the electric motors 114 (or a single electric motor 114) may instead be positioned in the airframe 118 and configured to drive (rotate) one or more propellers 106 via a gearbox and/or a driveshaft between the electric motor 114 and the one or more propeller 106.

While the multi-rotor solar-powered aircraft 100b is illustrated as having an airframe 118 with four booms 122 (each with a single rotor assembly 116 at the distal end of the boom 122), one of skill in the art would appreciate that additional, or fewer, booms 122 and/or rotor assemblies 116 may be employed to achieve a desired function. Further, while each boom 122 is illustrated as having only a single rotor assembly 116, multiple rotor assemblies 116 may be provided at the distal end of each boom 122. For example, a cross-member may be positioned at the distal end of each boom 122 and arranged to space the rotor assemblies 116 from one another (e.g., perpendicularly to the length of the boom 122) to prevent interference between propellers 106. The multi-rotor solar-powered aircraft 100b may be equipped with one or more payload pods 124 comprising, as discussed with regard to the solar-powered aircraft 100a, for example, one or more cameras, audio devices, and other sensors to provide ISR functionality. While the payload pods 124 are illustrated along the perimeter, a payload pod 124 may be rotatably and pivotally coupled to the underside of the airframe 118 (or another structural components, such as the booms 122) via a gimbal system to enable the payload pod 124 to be more easily oriented downward to monitor objects on the ground.

The solar-powered aircraft 100a, 100b may be equipped with one or more battery pack groups 200 to supply power to the various electric loads, as is illustrated in FIG. 2. Each battery pack group 200 generally comprises a plurality of battery packs 202 electrically coupled to each other, defining a power supply line 204, a ground line 206, and, where desirable, a data communication line 208. The ground line 206 may be electrically coupled to an equipotential point 310 (e.g., ground). The data communication line 208 may be shielded so as to mitigate electromagnetic interference (EMI) for, inter alia, the power supply line 204. The data communication line 208 may be coupled to one or more sensors 214 or devices that monitor or control, for example, the health and/or operating parameters (e.g., temperature, humidity, voltage, etc.) of each battery pack 202, such as each battery cell 212.

The battery packs 202 generally comprise one or more battery cells 212 (e.g., cylindrical battery cells 212a, prismatic battery cells 212b, etc.). The one or more battery cells 212 may be, for example, lithium ion cells; however other battery cell types are contemplated. The one or more battery cells 212 may be electrically arranged in a series configuration, where the number of electrically connected battery cells 212 may be increased and decreased (i.e., battery cells 212 electrically added/removed to the series) to control the battery pack's 202 output voltage and power across its output terminals, thereby yielding a variable output voltage battery pack 202. In certain embodiments, as discussed below, the one or more battery cells 212 may be electrically connected in a series configuration, in a parallel configuration, or a combination thereof to achieve a desired voltage and/or power.

The number of battery cells 212 electrically added to, or removed from, the battery pack's 202 circuit may be controlled using a printed circuit board (PCB) having one or more relays and/or other switching devices, which may be controlled via a battery pack controller, which may be processor controlled. The PCB's one or more relays and/or other switching devices may also electrically connect, disconnect, and/or reconnect the battery cells 212 to achieve a series configuration, a parallel configuration, or a combination thereof. To that end, the battery pack 202 may further include a battery pack controller to monitor and control the battery cells 212 in the battery pack 202. For example, the battery pack controller may include a processor that contains algorithms to read an individual battery pack's 202 information and, based on information relating to load requirements of an electric load 304 received via data communication line 208, configure a battery pack 202 to best suit the load requirements of the electric load 304, which may be constant or variable.

Thus, the cells may be automatically connected (or reconnected) in series, parallel, or a combination thereof to achieve a target voltage and power rating. For example, if a battery pack 202 physically comprises 50 battery cells 212, each battery cell 212 being nominally rated 1 volt and 0.1 mA (although other voltages and currents are possible per battery cell 212), the voltage of the battery pack 202 may be dynamically adjusted from 0 to 50 volts (0 to 5 A) in 1 volt (0.1 mA) increments (e.g., as battery cells 212 are electrically added or removed in series). The connections, however, need not be limited to series connections. In another example, a first set of 25 battery cells 212 may be connected in series while a second set of 25 battery cells 212 may be connected in series. The first set and the second set of battery cells 212 may then be electrically connected to each other in parallel to yield a 25 volt battery at 5 A.

The battery packs 202 within a battery pack group 200 are preferably electrically connected to one another in parallel via one or more interconnect connector sets 210 to facilitate the passing of power and/or data signals from one battery pack 202 to another battery pack 202. As illustrated, each of the one or more interconnect connector sets 210 comprises a first connector 210a (e.g., a female connector) and a second connector 210b (e.g., a male connector) configured to mate with one another. For example, when arranged in a row, power and/or data signals may be conveyed from one end (e.g., proximal end) of a battery pack group 200 to an opposite end (e.g., distal end) of the battery pack group 200 via interconnect connector sets 210, each of which can provide pass through functionality. Thus, as illustrated, the battery packs 202 can integrate the power rails (e.g., power supply line 204, ground line 206) and data communication line 208 with in-line connections such that battery packs 202 can be attached to one another to form continuous power and data pathways for feeding the load and interacting with the controller 302. Therefore, each battery pack group 200 can be expanded and contracted as needed (e.g., additional battery packs 202 may be connected or disconnected). In other words, power and/or data signals are carried across the battery pack group 200, thereby only requiring a harness connection at one end of the battery pack group 200. Consequently, an energy storage system having such battery pack groups 200 provides for quick electrical and mechanical integration. Further, the battery packs 202 may be fabricated in bulk, thereby obviating the need for costly, complicated, and potentially unreliable harness.

In certain aspects, the solar-powered aircraft 100a may allocate (or reallocate) power generated by one or more solar panels 108 to a specified battery pack group 200 or plurality of battery pack groups 200 based on a power need, whether or not the components are co-located. For example, if a solar panel 108 on a leading edge of a wing (or other flight surface) is generating power, but the battery pack group 200 typically associated with the solar panel 108 on the leading edge is at capacity, the power may be distributed to a different battery pack group 200 (or the voltage of the battery pack group 200 on the leading edge may be leveled with a different battery pack group 200, such as a depleted battery pack group 200). Likewise, solar-powered aircraft 100a may allocate or reallocate power from the battery pack groups 200 to one or more electric loads 304. To that end, the solar-powered aircraft 100a may employ a power distribution system 300a, 300b that dynamically maintains and/or redistributes power throughout the solar-powered aircraft's 100a, 100b components.

Figure 3A:
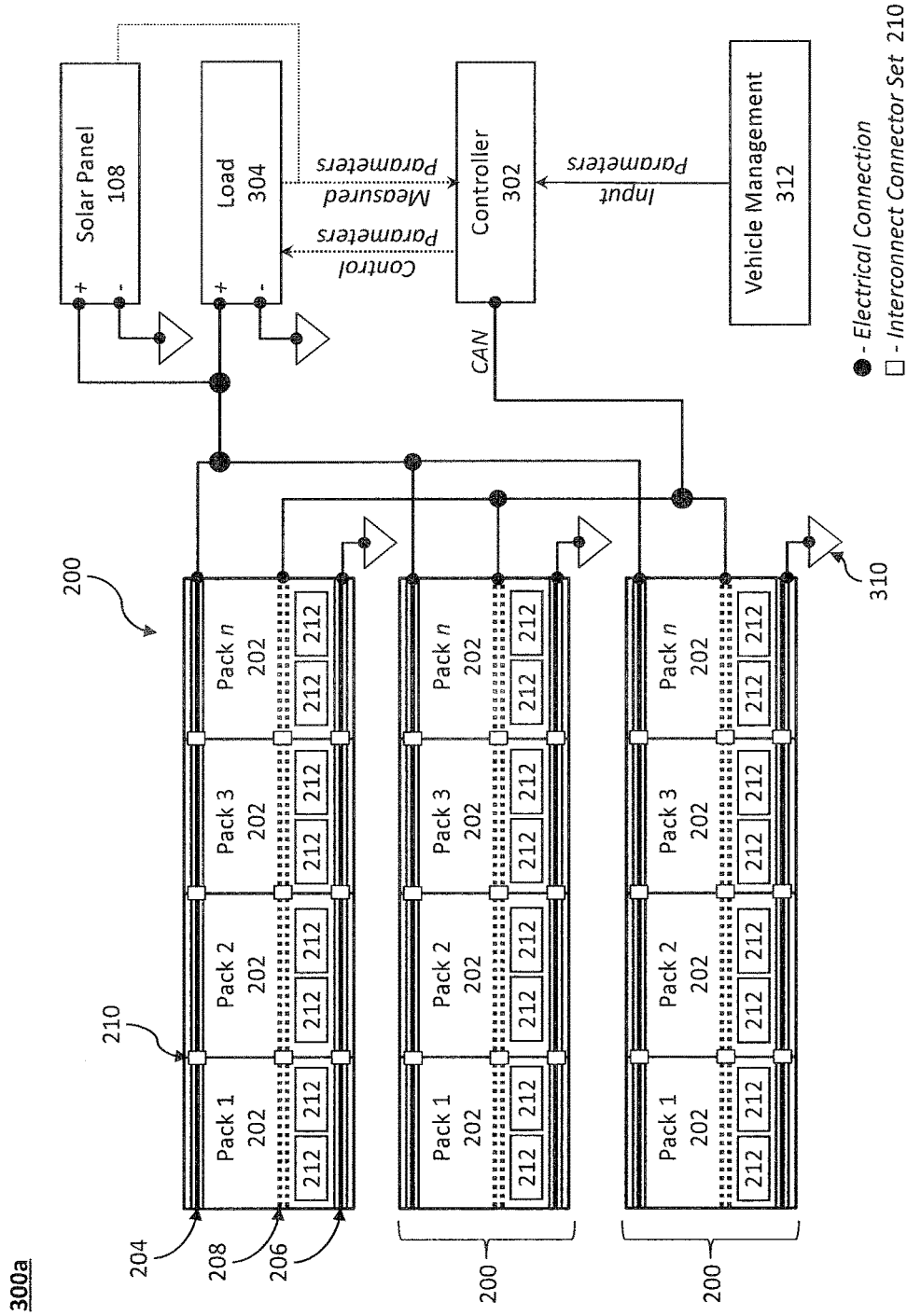
FIGS. 3a and 3b illustrate improved energy storage systems suitable for use with a solar-powered aircraft.
Figure 3B:
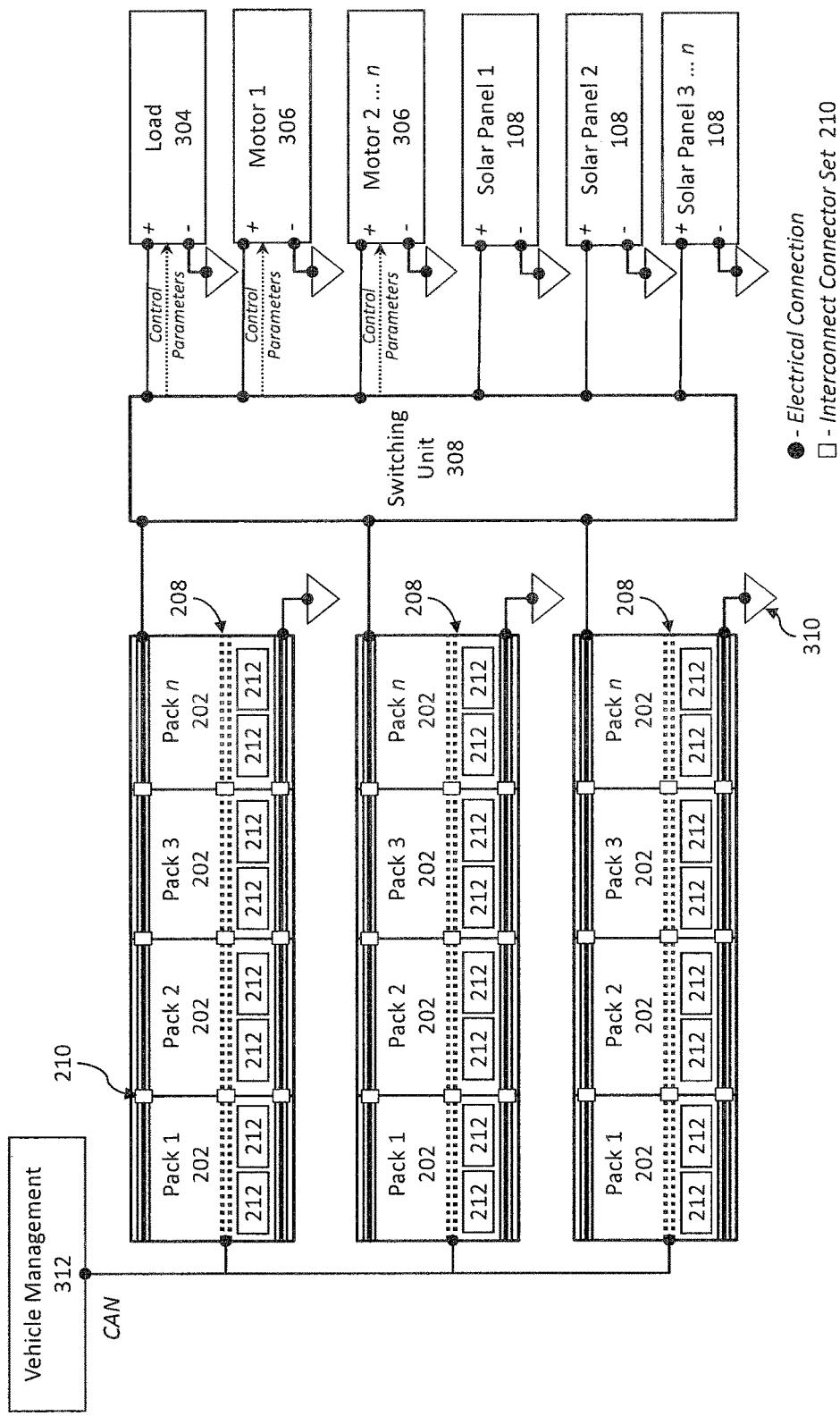

FIGS. 3a and 3b illustrate improved energy storage systems suitable for use with a solar-powered aircraft. Specifically, FIG. 3a illustrates a solar array and loads directly tied to a battery system having a grouping of one or more parallel battery strings, while FIG. 3b illustrates one or more solar arrays and one or more power loads connected to the parallel battery strings through a switching network. Traditional large scale battery systems are not sufficient for controlling voltage controllable battery packs 202. In addition, traditional battery packs are connected through one or more busbars or wire harnesses, which is suboptimal from both weight and complexity standpoints. Moreover, typical battery systems also cannot control the various parallel strings' output voltage and are unable to balance the source current with secondary elements. As taught herein, however, an array of intelligent controllable battery packs 202 and solar panels 108 may be controlled by a controller 302 or a power allocation switching unit 308. The energy storage systems 300a, 300b facilitate extended operation and management of power collected by the solar panels 108. The various components of the energy storage systems 300a, 300b may be distributed throughout the solar-powered aircraft 100a to both distribute the weight of the energy storage system 300 and to mitigate catastrophic loss in the event of localized damage to the solar-powered aircraft 100a.

Turning to FIG. 3a, an improved energy storage system 300a is illustrated as having one or more battery pack groups 200 operatively coupled with a controller 302, one or more solar panels 108, and one or more electric loads 304 (or an output thereto). As illustrated, the one or more battery pack groups 200 are preferably electrically connected to one another in parallel. However, alternative arrangements may be employed to achieve a particular need (e.g., desired voltage/power). The controller 302, which may be processor controlled, monitors each of the one or more battery pack groups 200 (and separately, each battery pack 202), the one or more solar panels 108, and the one or more electric loads 304. For instance, in response to an input parameter (e.g., an instruction form the solar-powered aircraft's 100a, 100b vehicle management system 312), the controller 302 may adjust the electronic load 304 and/or adjust (or reallocate) power from the one or more battery pack groups 200 to meet the electronic load's 304 needs.

In addition, because each of the battery packs 202 can offer a variable output voltage, the controller 302 may adjust the battery pack 202 voltages to account for transmission losses between the battery pack 202 sources and the required load in order to regulate the voltage at the electric load 304. The controller 302 may communicate through either a simplex or redundant communications bus to each of the battery packs 202 in an energy storage system 300. In certain aspects, the controller 302 may employ one or more control area network (CAN) buses. The controller 302 may further have the ability to set a target voltage for individual solar panels 108, while reading their current outputs in order to balance the outputs of the individual battery packs 202, to avoid one battery pack 202 producing significantly larger currents than another battery pack 202.

Historically, solar power systems would rely on a solar panel interfacing to a grid or battery system through a maximum power point tracker composed of a circuit assembly that adjusts the load impedance presented to the solar panel in or to get the maximum power out of the array. These trackers are typically heavy, costly, and detract from the total output power of the solar panel. However, using controlled variable output battery packs 202 directly mated to solar panels 108 in a battery system can directly control the solar panel voltage and the maximum power point of the solar panels 108, which occurs while running a motor or motors to drive the vehicle. Thus, the present solar-powered aircraft 100a further provides flexibility in powering the busbar from one or more power sources (e.g., a power system set 402) via a power allocation switching unit 308.

Turning to FIG. 3b, an improved energy storage system 300b is illustrated as having one or more battery pack groups 200, one or more solar panels 108, a plurality of motors 306, and one or more other electric loads 304, operatively coupled with a power allocation switching unit 308. As illustrated, the vehicle management system 312 is coupled the data communication line 208 of each battery pack group 200, which are electrically connected to one another in parallel. The vehicle management system 312 can therefore monitor the status of each battery pack 202 via, for example, a CAN bus. The power allocation switching unit 308 selectively connects and/or disconnects each of the one or more solar panels 108 and one or more battery pack groups 200 from a busbar, which conveys power to the various components of the solar-powered aircraft 100a (e.g., motors 306 and other electric loads 304, such as a payload, avionics, etc.).

The disclosed power allocation switching unit 308 further offers significant weight and reliability advantages through the removal of maximum power point trackers. More specifically, in order to maximize efficiency, sub-portions of the battery array may need to be isolated from one another while controlling portions of the solar panel 108, all while still driving the motor(s).

Figure 4A:
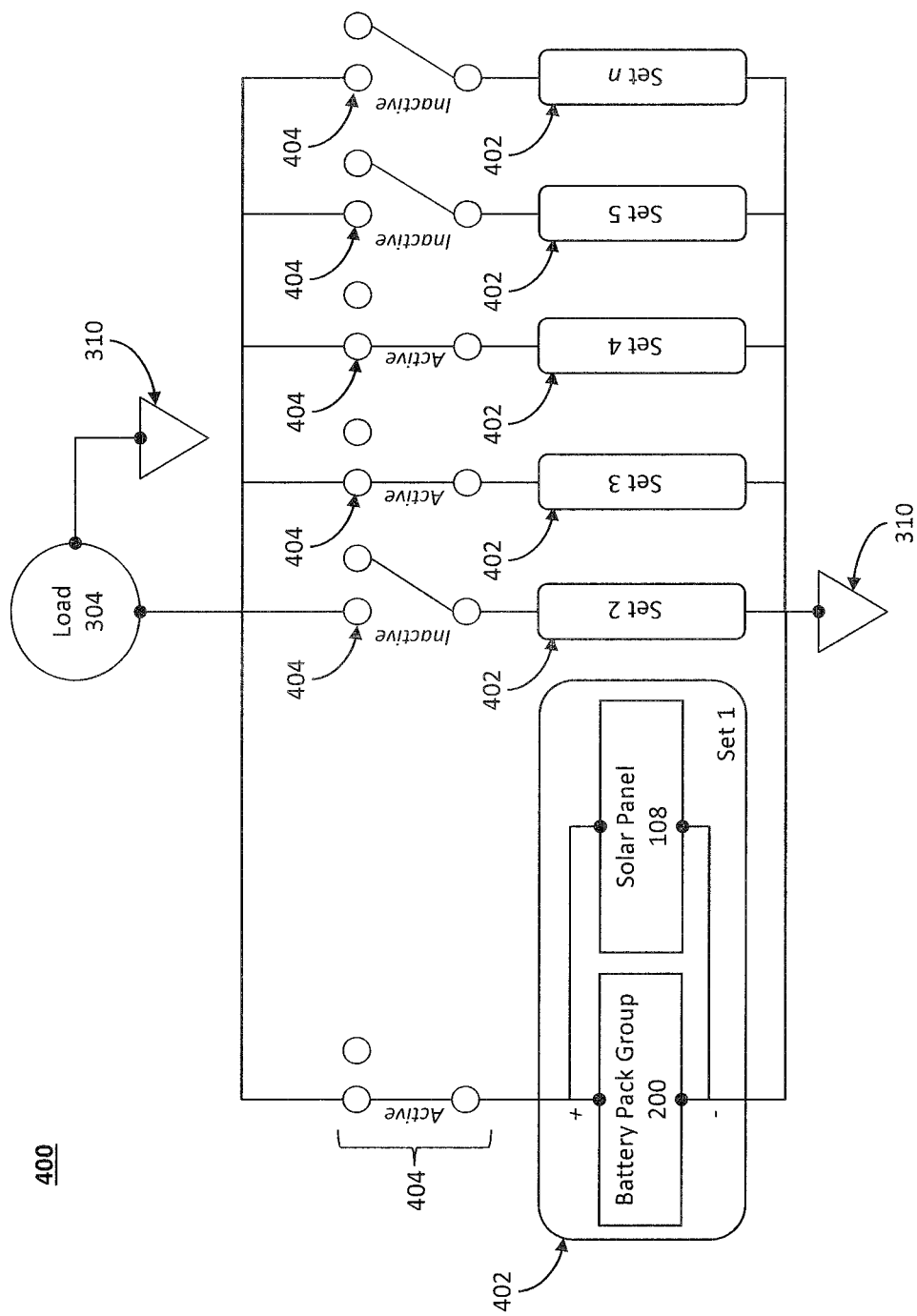
FIGS. 4a and 4b illustrate, respectively, daytime and nighttime operation system diagrams for a power allocation switching unit system suitable for a solar-powered aircraft.
Figure 4B:
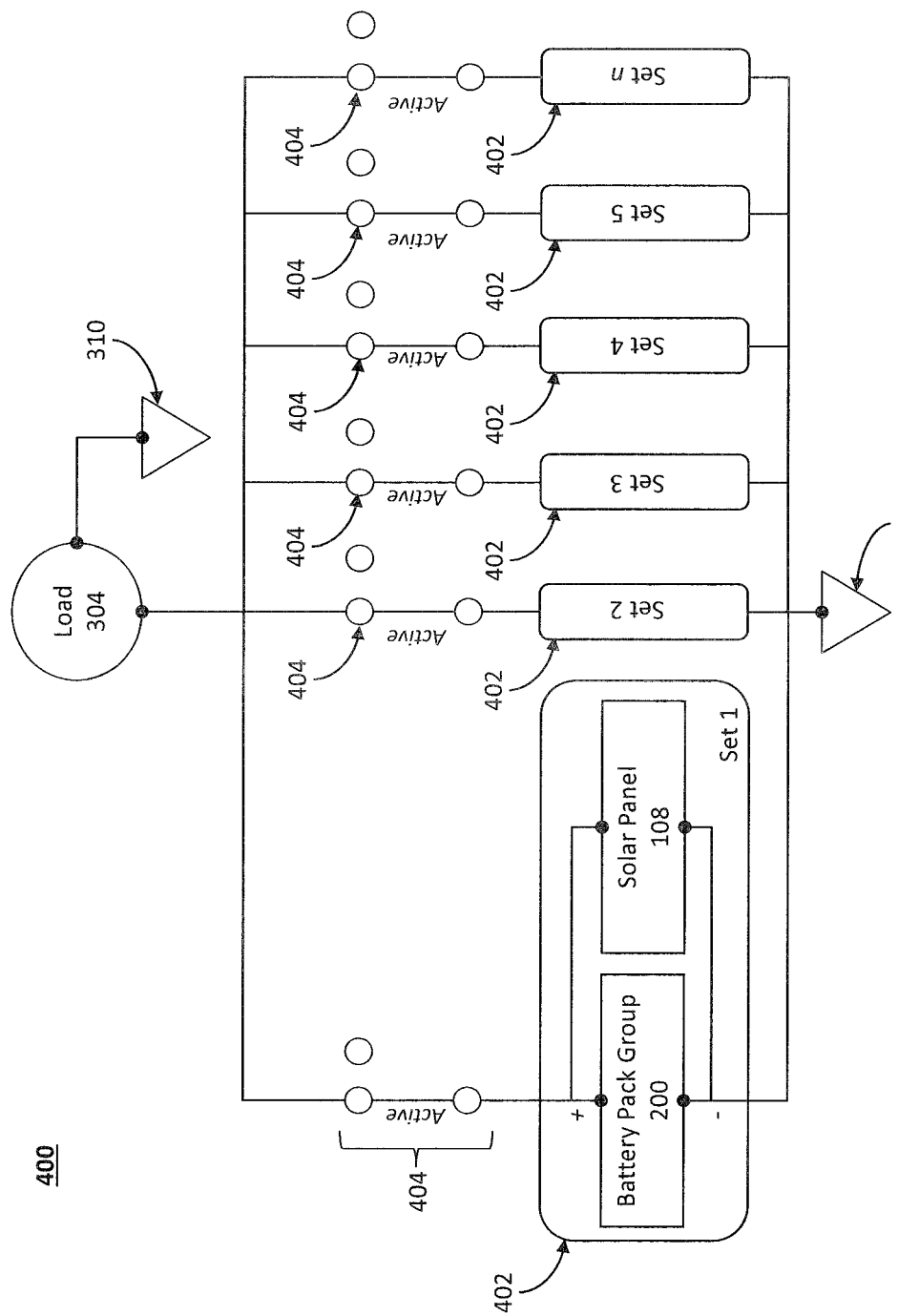

FIGS. 4a and 4b illustrate daytime (i.e., sun up) and nighttime (i.e., sun down) operation system diagrams for an example power allocation switching unit system 400. By adding a parallel set of single-pole, single-throw (SPST) source switches 404, such as solid state or mechanical switches, individual power system sets 402 (e.g., a set of one or more battery packs 202 or battery pack groups 200 and one or more solar panels 108) or portions thereof can drive the motor while the other power system sets 402 are charging. In order to switch between which power system set 402 feeds the electric load 304 (e.g., motor 306), the oncoming power system set 402 is voltage equalized to, for instance, the motor busbar.

Once equalized the oncoming source switch is closed and the offgoing source switch is opened. This switching is done based at least in part on which power system set 402 is at the highest state of charge so as to level the battery arrays during the day. The offgoing battery pack 202 of a power system set 402 can then have its voltage changed to the maximum power point of its local solar panel 108. At night the power system sets 402 can be discharged together in order to minimize the total system discharge rate and maximize the output energy of the battery arrays.

The power allocation switching unit system 400 generally comprises a plurality of power system sets 402, each of which having, for example, a battery pack group 200 and one or more solar panels 108 electrically coupled to the battery pack group 200 in parallel. While a battery pack group 200 is described, the power allocation switching unit system 400 and associated methods may be equally applied to individual battery packs 202. As illustrated, the negative terminal of each of the power system sets 402 is electrically coupled to the equipotential point 310 (e.g., ground), while the positive terminal of each of the power system sets 402 is electrically coupled to an electric load 304, which is also electrically coupled to the equipotential point 310. As noted above, the electric load 304 may include, for example, one or more motors 306. As illustrated, the positive terminal of each of the power system sets 402 is independently and selectively controlled through a plurality of source switches 404. In other words, one or more source switches 404 may be selectively activated or deactivated to connect or disconnect, respectively, one or more power system sets 402 to or from the electric load 304 (e.g., via a busbar). The source switches 404 may be one or more electrically control switching devices or relays, including, without limitation, electromechanical relays, reed relays, solid state relays, etc. FIG. 4a illustrates a daytime operation system diagram comprising a plurality of the power system sets 402 adjusted to group maximum power point voltage, while FIG. 4b illustrates a nighttime operation system diagram with the power system sets 402 adjusted to the same voltage. That is, during nighttime operation, each of the source switches 404 is activated, thereby completing the circuit so as to set the battery pack groups 200 to the same voltage.

In certain aspects, each assembly of the solar-powered aircraft 100a (e.g., fuselage 110, wing panel 102, etc.) may employ a self-sufficient power system to limit failure propagation in the event of localized damage to the solar-powered aircraft 100a. That is, each subsystem of the solar-powered aircraft 100a may be fed by a separate power system set 402. However, the power allocation switching unit system 400 may be further configured to transfer or reallocate power throughout the solar-powered aircraft 100a to mitigate failures in the event of hardware malfunction or damage. For example, if a particular power system set 402 is damaged or otherwise unavailable, the power allocation switching unit system 400 may disconnect that damaged power system set 402 (or component thereof) and allocate power from a different power system set 402. In addition, the power from the various power system sets 402 may be allocated or reallocated to one or more electric loads 304 based at least in part on charge state and/or maximum power point voltage of the power system sets 402. In certain aspects, one or more voltage controllable battery packs 202 may be set to a target voltage to track the maximum power point of a solar panel 108, such as the first solar panel or the second solar panel.

FIG. 5 illustrates an example algorithm 500 for managing battery groups and solar panels using a power allocation switching unit system 400. The process initiates at step 502, whereupon it proceeds to step 504. At step 504, the power allocation switching unit system 400 identifies the need to switch or otherwise reallocate the power system sets 402 electrically coupled to the electric load 304. At step 506, the power allocation switching unit system 400 determines which power system set(s) 402 will be electrically coupled to the electric load 304. At step 508, the power allocation switching unit system 400 equalizes voltages of the oncoming power system set(s) 402 (e.g., the power system set(s) 402 that are coming online) with the offgoing power system set(s) 402 (e.g., the power system set(s) 402 that are going offline). At step 510, the power allocation switching unit system 400 closes (activates) the source switches 404 for the oncoming power system set(s) 402. At step 512, the power allocation switching unit system 400 opens (deactivates) the source switches 404 for the off going power system set(s) 402. At step 514, the power allocation switching unit system 400 returns the power system set(s) 402 to their maximum power points. At step 516, the algorithm 500 may exit and proceed to step 518 where the process ends. Alternatively, the algorithm 500 may return to step 504. The process may repeat until terminated by the operator or another control system.

Figure 6A:
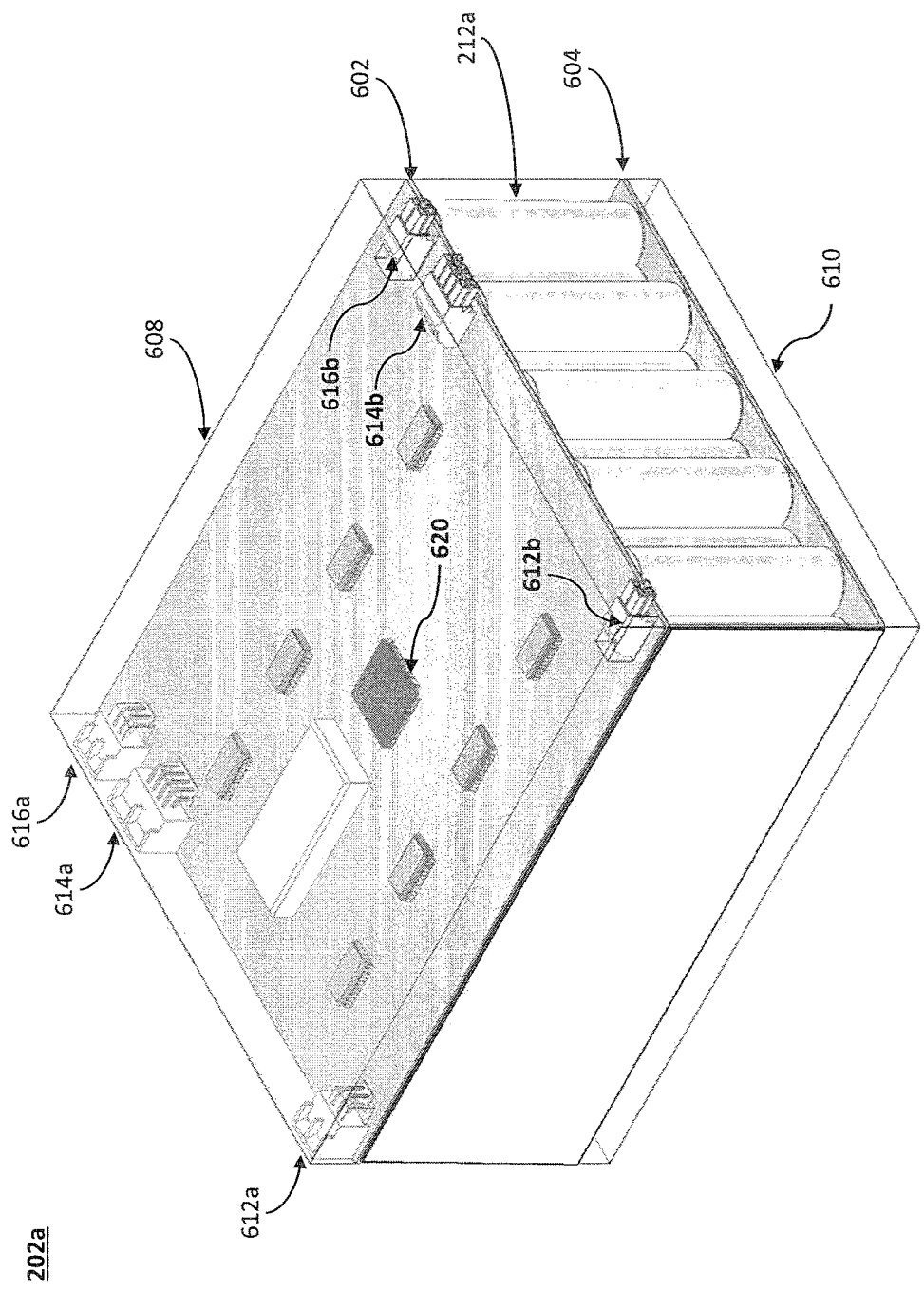
FIGS. 6a and 6b show, respectively, interconnect battery packs with axial cylindrical battery cells and prismatic battery cells, which may be used in connection with the improved energy storage system.
Figure 6B:
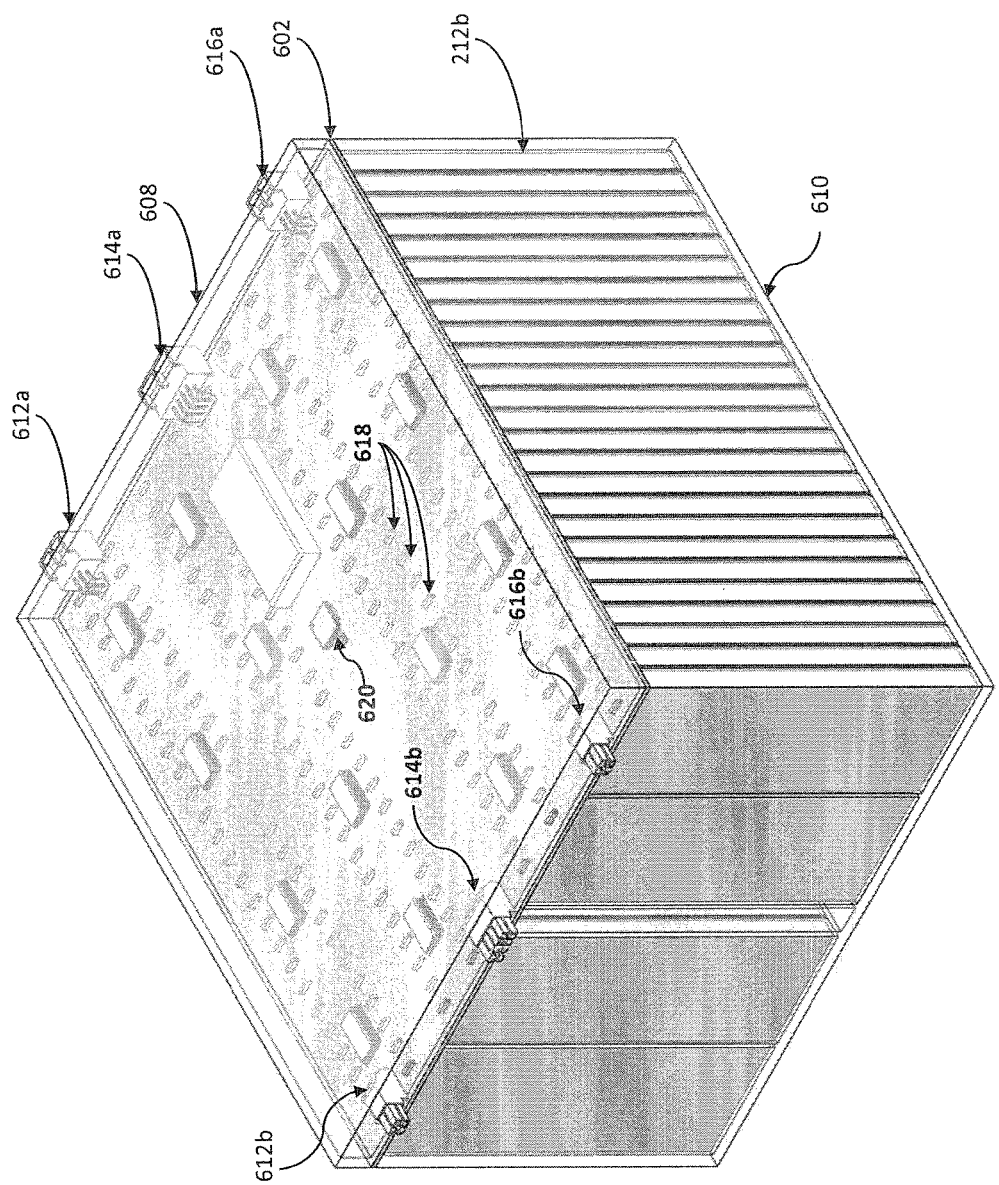

FIGS. 6a and 6b illustrate, respectively, interconnect battery packs 202 in accordance with an aspect of the present invention having axial cylindrical battery cells 212a and prismatic battery cells 212b. Historically, packaging a group of battery cells 212 would detract from the overall pack specific energy density. Moreover, current methods are not suitable as they are not designed with long endurance aircraft and rate production in mind. As disclosed herein, however, the battery packs 202 may be manufactured in one or more improved configurations, including a cylindrical interconnect battery pack 202a and a prismatic interconnect battery pack 202b. The disclosed battery packs 202 offer very low packaging weight, provide mounting location for integrated circuitry, and facilitate rapid automated construction process.

An interconnect battery pack 202, for example, may include one or more rigid flex PCBs where rigid sections may be tied together by a flexible circuit section. To increase structural integrity, a wrap material may be wrapped around a group of battery cells 212. The battery cells 212 may be lithium cells (e.g., lithium polymer, lithium ion, etc.). The battery packs 202 are preferably sufficiently flexible to account for flexing of the solar-powered aircraft 100a or components thereof (e.g., the wing panel 102).

The PCB may further include circuitry to monitor and control the battery cells 212 within a battery pack 202 via one or more sensors 214. For example, the PCBs may provide circuitry to increase or decrease the number of battery cells 212 electrically connected in a given battery pack 202 to achieve a targeted voltage/power by dynamically disconnecting and/or reconnecting through the use of solid state or mechanical switches. For example, the PCB may employ conductor traces arranged in a grid fashion (or as needed to electrically couple with the battery cells 212), with switches positioned in-line between each of the various connections.

If electrical tabs 618 (such as solder tabs, or other similar terminals) are available on the battery cells 212, the electrical tabs 618 may pass through the top PCB 602 (or bottom PCB 604, as applicable) and may be soldered directly to the rigid PCBs. A protector 608 may formed from plastic or similar material and used to secure, support, or otherwise retain the battery cells 212 as well as for the rigid mounting boards. In addition, separate protector pieces may be mounted on top and bottom of the rigid PCB to protect circuitry mounted to the rigid PCB and to provide mounting locations to mount the battery pack 202 to a structure (e.g., the solar-powered aircraft's 100a, 100b fuselage or airframe).

In certain aspects, the protector 608 may be fabricated as a sealed cube, cuboid, or other shape sized to receive the electrical components of the battery pack 202 to mitigate dirt, moisture, and other contamination. The sealed protector 608, however, may be provided with one or more vents to permit airflow therethrough. Male and female components of each interconnect connector set 210 may be positioned on opposite sides of the board (e.g., the top PCB 602), which enable the battery pack 202 to interface with other battery packs 202 to form an array (e.g., a battery pack group 200). The interconnect connector sets 210 may be differently arranged, however, to account for different arrangements of battery packs 202 within in a battery pack group 200. For example, a battery pack 202 positioned at a corner may include male and female components of each interconnect connector set 210 at perpendicularly adjacent sides.

An example cylindrical interconnected battery pack 202a is illustrated in FIG. 6a having a top PCB 602, a bottom PCB 604, and a plurality of cylindrical battery cells 212a perpendicularly positioned therebetween. The rigid PCBs 602, 604 make electrical contact with cylindrical battery cells' 212a positive and negative terminals via, for example, a small spring contact mounted to a rigid PCB 602, 604 at the negative contact. A spring contact may be used to mitigate design complication (e.g., increasing the design tolerances).

The top PCB 602 is provided with a plurality of interconnect connector sets 210 including, without limitation, a set of power interconnect connectors 612a, 612b, a set of ground interconnect connectors 616a, 616b, and a set of data interconnect connectors 614a, 614b. Each set of interconnect connector sets 210 may include a male component and a corresponding female component, the female component being configured to electrically couple with a male component positioned on a different cylindrical interconnect battery pack 202a (e.g., an adjacent cylindrical interconnect battery pack 202a). The female component and the male component on the same cylindrical interconnect battery pack 202a are electrically coupled (e.g., via top PCB 602) to one another and to the appropriate terminal(s) or port(s) of the interconnect battery pack 202a (e.g., the positive terminal, the negative terminal, battery monitor, battery controller, etc.). Thus, the interconnect connector sets 210 provide a pass through such that power or data is transferred regardless of the operational status of the cylindrical interconnect battery pack 202a. For example, in the event that a cylindrical interconnect battery pack 202a malfunctions, the pass through connectors bypass the malfunctioning cylindrical interconnect battery pack 202a. The cylindrical interconnect battery pack 202a may be further provided with a top protector 608 and bottom protector 610, which protect the internal components (e.g., the PCBs 602, 604, cylindrical battery cells 212a, and various connectors).

An example prismatic interconnect battery pack 202b is illustrated in FIG. 6b. As illustrated, the prismatic interconnect battery pack 202b may be structurally similar to the cylindrical interconnect battery pack 202a of FIG. 6a, but the bottom PCB 604 may be omitted to the extent that the conductors (e.g., electrical tabs 618) of the prismatic battery cells 212b are only located on the one side (e.g., the top side) of the prismatic battery cells 212b. The bottom protector 610, however, may be configured to provide additional structural support to the underside of the prismatic interconnect battery pack 202b.

As illustrated, the prismatic interconnect cell may employ a rigid PCB where the battery cells 212b attach to the top PCB 602 using electrical tabs 618 exiting the battery cell 212b. The battery cells 212b may be, for example, pouch-style lithium polymer cells. The bottom protector 610 may be provided with individual slots to separately retain each of the prismatic battery cells 212b. Thus, the battery cells 212b may reside in a structure with individual slots per each cell made of plastic or a similar material. The top PCB 602 is attached to the bottom protector 610 and an additional plastic or similar cover may be attached above the top PCB 602 or through it to the support structure to create a single integrated unit.

In either the cylindrical interconnect battery pack 202a or the prismatic interconnect battery pack 202b, the protectors 608, 610 may provide vents and integrated environmental controls systems controlled by a processor 620 coupled to the top PCB 602. The integrated environmental systems are tailored to the needs of the battery pack 202. To that end, the protector 608, 610 may be further provided with one or more sensors 214 to monitor the health and/or operating parameters (e.g., temperature, humidity, etc.) of each prismatic battery cell 212b. That is, the top PCB 602 includes circuitry to monitor and control the array/string of prismatic battery cells 212b. The cell support serves to mechanically retain and locate cells during manufacturing while also providing counter pressure on cells at above sea level altitude. The complexity of the cell support depends on the manufacturing process.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A solar power system comprising:
a first solar panel and a second solar panel;
a load, the load comprising an electric motor operatively coupled with a propeller;
a first battery pack group and a second battery pack group, each of said first and second battery pack groups comprising one or more voltage controllable battery packs, each of said one or more voltage controllable battery packs comprising a plurality of battery cells and a rigid printed circuit board electically coupled with plurality of battery cells;
a first source switch and a second source switch,
wherein the first source switch is electrically coupled in-line between the first battery pack group and the load, and wherein the second source switch is electrically coupled in-line between the second battery pack group and the load; and a controller operatively coupled to each of said first source switch and said second source switch, the controller being configured to selectively activate or deactivate each of said first source switch and said second source switch.

2. The solar power system of claim 1, wherein said first battery pack group is electrically coupled to said first solar panel in parallel.

3. The solar power system of claim 2, wherein said second battery pack group is electrically coupled to said second solar panel in parallel.

4. The solar power system of claim 3, wherein the controller is configured to selectively activate or deactivate said first source switch and said second source switch as a function of a state of charge of the first battery pack group or the second battery pack group.

5. The solar power system of claim 3, wherein the controller is configured to selectively activate or deactivate said first source switch and said second source switch as a function of a maximum power point of the first solar panel or the second solar panel.

6. The solar power system of claim 3, wherein at least one of said one or more voltage controllable battery packs is set to a target voltage to track the maximum power point of the first solar panel or the second solar panel.

7. The solar power system of claim 3, wherein the controller is configured to selectively activate both of said first source switch and said second source switch to set the first battery pack group and the second battery pack group to the same voltage.

8. The solar power system of claim 7, wherein the controller is configured to set the first battery pack group and the second battery pack group to the same voltage during a nighttime operation.

9. The solar power system of claim 1, wherein the one or more voltage controllable battery packs of the first or second battery pack groups are electrically coupled to one another in parallel.

10. The solar power system of claim 4, wherein the rigid printed circuit board includes an interconnect connector to electrically couple with a corresponding interconnect connector of a second voltage controllable battery pack.

11. The solar power system of claim 1, wherein each of said one or more voltage controllable battery packs further comprises a second rigid printed circuit board electrically coupled with the plurality of battery cells, wherein the plurality of battery cells are positioned between said first rigid printed circuit board and said second rigid printed circuit board.

12. The solar power system of claim 1, wherein the rigid printed circuit comprises a set of power connectors, a set of ground connectors, and a set of data connectors.

13. The solar power system of claim 1, wherein the first solar panel is positioned on a first wing panel and a second solar panel is positioned on a second wing panel.

14. A solar power system comprising:

a solar panel;

a load, the load comprising an electric motor operatively coupled with a propeller;

a battery pack group, said battery pack group comprising one or more voltage controllable battery packs, each of said one or more voltage controllable battery packs comprising a plurality of battery cells, wherein at least one of said one or more voltage controllable battery packs comprises a rigid printed circuit board electrically coupled with the plurality of battery cells, the rigid printed circuit board including an interconnect connector to electrically couple with a corresponding interconnect connector of a second voltage controllable battery pack.

15. The solar power system of claim 14, further comprising a source switch and a controller operatively coupled to said source switch, wherein the source switch is electrically coupled in-line between the battery pack group and the load, and wherein the controller is configured to selectively activate or deactivate said source switch.

16. The solar power system of claim 14, wherein said battery pack group is electrically coupled to said solar panel in parallel.

17. The solar power system of claim 14, wherein the controller is configured to selectively activate or deactivate said source switch based at least in part upon (a) a state of charge of the battery pack group or (b) a maximum power point of the solar panel.

18. The solar power system of claim 14, wherein at least one of said one or more voltage controllable battery packs is set to a target voltage to track the maximum power point of the solar panel.

19. The solar power system of claim 14, wherein the at least one of said one or more voltage controllable battery packs comprises a second rigid printed circuit board electrically coupled with the plurality of battery cells, wherein the plurality of battery cells are positioned between said first rigid printed circuit board and said second rigid printed circuit board.

20. The solar power system of claim 14, wherein the at least one of said one or more voltage controllable battery packs comprises an integrated environmental controls system.

21. The solar power system of claim 14, wherein the interconnect connector is configured to convey both power and data.

* * * * *